(12) United States Patent
Park et al.

(10) Patent No.: US 11,762,839 B2
(45) Date of Patent: Sep. 19, 2023

(54) SEARCH METHOD USING DATA STRUCTURE FOR SUPPORTING MULTIPLE SEARCH IN BLOCKCHAIN-BASED IOT ENVIRONMENT, AND DEVICE ACCORDING TO METHOD

(71) Applicant: SOGANG UNIVERSITY RESEARCH FOUNDATION, Seoul (KR)

(72) Inventors: Soo Yong Park, Seoul (KR); Dong Young Lee, Seoul (KR)

(73) Assignee: SOGANG UNIVERSITY RESEARCH FOUNDATION, Seoul (KR)

( * ) Notice: Subject to any disclaimer, the term of this patent is extended or adjusted under 35 U.S.C. 154(b) by 438 days.

(21) Appl. No.: 16/954,024

(22) PCT Filed: Dec. 13, 2018

(86) PCT No.: PCT/KR2018/015867
§ 371 (c)(1),
(2) Date: Jun. 15, 2020

(87) PCT Pub. No.: WO2019/117651
PCT Pub. Date: Jun. 20, 2019

(65) Prior Publication Data
US 2021/0081400 A1  Mar. 18, 2021

(30) Foreign Application Priority Data
Dec. 13, 2017  (KR) ........................ 10-2017-0170895
Dec. 13, 2018  (KR) ........................ 10-2018-0160728

(51) Int. Cl.
*G06F 16/23* (2019.01)
*G06F 16/22* (2019.01)
(Continued)

(52) U.S. Cl.
CPC ...... *G06F 16/2365* (2019.01); *G06F 16/2246* (2019.01); *G06F 16/2264* (2019.01); *H04L 9/0637* (2013.01); *H04L 9/50* (2022.05)

(58) Field of Classification Search
CPC ............. G06F 16/2365; G06F 16/2246; G06F 16/2264; G06F 16/9027; H04L 9/0637;
(Continued)

(56) References Cited

U.S. PATENT DOCUMENTS

| | | | |
|---|---|---|---|
| 7,443,321 B1 * | 10/2008 | Kaufman ................ | H03M 7/30 341/51 |
| 2009/0019345 A1 * | 1/2009 | Kaufman ............ | H03M 13/096 711/E12.017 |

(Continued)

FOREIGN PATENT DOCUMENTS

| | | |
|---|---|---|
| KR | 10178158300000 | 9/2017 |
| WO | 2017079652 | 5/2017 |

OTHER PUBLICATIONS

Brennan et al., "Blockchain The Trust Disrupter", Credit Suisse, Aug. 3, 2016, 135 pages.
(Continued)

*Primary Examiner* — Phong H Nguyen
(74) *Attorney, Agent, or Firm* — DUANE MORRIS LLP; Gregory M. Lefkowitz; Joaquin Hernandez

(57) ABSTRACT

The present disclosure relates to a search technology using a data structure for supporting multi-search in a blockchain-based IoT environment, and a method for providing a search function for blockchain includes receiving block data via a network, verifying transactions included in the received block data, and adding the block data as a node to an index tree of multidimensional index structures based on information about each transaction in the transaction verification.

17 Claims, 10 Drawing Sheets

(51) Int. Cl.
*H04L 9/06* (2006.01)
*H04L 9/00* (2022.01)

(58) Field of Classification Search
CPC ....... H04L 9/50; H04L 63/12; H04L 2209/56; H04L 9/3239; G06Q 20/3678; G06Q 20/3827
USPC .................................. 707/687, 690, 703, 741
See application file for complete search history.

(56) References Cited

U.S. PATENT DOCUMENTS

| | | | | |
|---|---|---|---|---|
| 2014/0012810 | A1* | 1/2014 | Chen ..................... | G06F 16/245 707/610 |
| 2016/0321654 | A1* | 11/2016 | Lesavich ............... | H04L 67/104 |
| 2017/0344435 | A1* | 11/2017 | Davis .................. | G06F 16/9014 |
| 2018/0247191 | A1* | 8/2018 | Katz ................... | G07F 17/3206 |
| 2019/0109713 | A1* | 4/2019 | Clark .................... | G06F 16/182 |
| 2019/0165948 | A1* | 5/2019 | Sako ..................... | H04L 9/3255 |
| 2020/0252745 | A1* | 8/2020 | Bellenger ............. | H04W 4/023 |
| 2022/0070617 | A1* | 3/2022 | Bellenger .......... | G06Q 20/3224 |

OTHER PUBLICATIONS

Li et al., "Efficient implementation of a multi-dimensional index structure over flash memory of storage systems", J. Supercomput, 2013, vol. 64, pp. 1055-1074.

Yue et al., "Healthcare Data Gateways: Found Healthcare Intelligence on Blockchain with Novel Privacy Risk Control", J. Med. Syst. 2016, vol. 40, pp. 1-8.

Lee, "Search Module for Reliable Multi-search Scenario Support in Blockchain", Master's Thesis, Graduate School of Sogang University, Feb. 2018, 52 pages.

Satoshi, "Bitcoin: A Peer-to-Peer Electronic Cash System", 2008, pp. 1-9.

* cited by examiner

FIG. 1

SEARCH METHOD USING DATA STRUCTURE FOR SUPPORTING MULTIPLE SEARCH IN BLOCKCHAIN-BASED IOT ENVIRONMENT, AND DEVICE ACCORDING TO METHOD

CROSS-REFERENCE TO RELATED APPLICATIONS

This application is a § 371 national stage entry of International Application No. PCT/KR2018/015867, filed on Dec. 13, 2018, which claims priority to South Korean Patent Application No. 10-2017-0170895, filed Dec. 13, 2017 and 10-2018-0160728, filed Dec. 13, 2018, the entire contents of which are incorporated herein by reference.

TECHNICAL FIELD

The present disclosure relates to blockchain-related technology, and more particularly, to a data structure capable of performing a search function in blockchain technology in an Internet of Things (IoT) environment, and a search method and device using the same.

BACKGROUND ART

Blockchain technology has been developed so much since bitcoin was created in 2009. There are various definitions of blockchain, but typically, according to The Economist, blockchain is defined as a technology that builds trust with no trusted third party in an untrustworthy environment. To build trust, blockchain technology provides a solution to maintain the sameness of a distributed ledger through a consensus algorithm with a network by allowing many users to independently manage the same distributed ledger. Through the above-described method, the users may increase dual security of transactions and blocks and reliability of transactions on the network through security technologies such as Public Key Infrastructure (PKI), a hash algorithm, etc. Actually, the network power of bitcoin—the most representative example of blockchain—amounts to 500 supercomputers, and for a 51% attack to be successful, when an attacker has 251 supercomputers, there is a likelihood that an attack will succeed. With the emergence of a cryptocurrency, bitcoin technology shows its worth as a global currency available in the world, while blockchain technology as a foundational technology is appreciated for its value as a technology that can advance the technologies used for security and trust.

Currently, many companies are interested in reliable data management of blockchain and they are considering the application of blockchain in their business. Blockchain technology emerged as a foundational technology for digital currency and has been prevalently used in the financial industry, but with the emergence of smart contract technology, it is now used in a wide range of applications, for example, Internet of Things (IoT), smart city and energy grid business.

As the range of industrial applications becomes broader, there is a need for changes to blockchain according to the characteristics of the industries. To meet the need, blockchain platforms currently available in the market have advantages suited to the characteristics of each industry. Typically, Tangle (IOTA), which is a blockchain platform for IoT, has no block and is a Directed Acyclic Graph (DAG), and its structure is different from the blockchain structure to support IoT micropayments. Additionally, 'Slock.it' succeeded in developing door-lock using an embedded Ethereum computer with collaboration of Samsung Electronics, IBM, The Linux Foundation and others to take advantage of blockchain in the sharing economy. With the increasing application of blockchain technology for IoT environment, many IoT related companies are making efforts to understand and adopt blockchain technology, and for example, global tech companies such as Foxconn and Bosch formed a consortium for the development of blockchain platforms for IoT.

In blockchain, the sector considered important other than core technologies is search functionality. Basically, blockchain itself provides a search function. The typical example of blockchain, Bitcoin and Ethereum, provide a search function for transactions, blocks and account information using key-based LevelDB developed by Google. Along with this, there are web browsers that provide the search function. In the case of bitcoin, there are about 20 websites for search, and in the case of Ethereum, about 5 websites for search.

A blockchain consortium for use in industrial applications, 'Hyperleger', reflects the demand for search. 'Hyperleger' is a consortium in which 155 global leading companies participate, and proceeds with projects to address the companies' demands. The representative project, 'Fabric', which is an open blockchain platform, as well as about seven other projects are on progress. Among the ongoing projects, the third one is 'Hyperledger Explorer', and it started to visualize data in blockchain and provide a search function. Along with this, the demand to 'Fabric' is search function improvement in blockchain itself. According to one of proposals for development of the 'Fabric' project, 'Next-Ledger-Architecture-Proposal', 'Point in time queries' and 'SQL like query language' are the demands to 'Fabric', and this suggests a need to provide various search functions that have never been provided.

(Relevant art document) Satoshi Nakamoto, "Bitcoin: A Peer-to-Peer Electronic Cash System", 2008

DISCLOSURE

Technical Problem

The present disclosure is aimed at overcoming the limitation that the existing blockchain environment such as bitcoin does provide a multiple condition search or range search function provided by general databases, solving the low level of throughput problem, and addressing the shortcoming of the absence of a reliability solution for perfectly guaranteeing a search result value.

Technical Solution

To solve the above-described technical problem, a method for providing a search function for blockchain according to an embodiment of the present disclosure includes receiving block data via a network, verifying transactions included in the received block data, and adding the block data as a node to an index tree of multidimensional index structures based on information about each transaction in the transaction verification.

In the method for providing a search function for blockchain according to an embodiment, in the index tree of multidimensional index structures, a search key may be a plurality of fields according to Point Access Method (PAM), and transaction data may comprise multidimensional points and be stored in a disk. Additionally, the index tree of multidimensional index structures may be a balanced tree including nodes of a uniform size that is equal to a disk page size, each node may be stored in a page, an internal node may be responsible for one region in a multidimensional space, a leaf node may store data page information, and each transaction data may be located in a search space along an index node indicating a space to which each transaction data belongs.

The method for providing a search function for blockchain according to an embodiment may further include updating 'Mempool' that stores unconfirmed transactions, in the transaction verification.

The method for providing a search function for blockchain according to an embodiment may further include after the transaction verification is completed, calculating 'Merkle Root' based on transaction information, and verifying a block header.

The method for providing a search function for blockchain according to an embodiment may further include storing the transaction verified block data in a local disk.

To solve the above-described technical problem, a method for providing a search function for blockchain according to another embodiment of the present disclosure includes receiving, by a receiver, block data according to multidimensional index structures from a sender via a network, verifying, by the receiver, transactions included in the received block data, and adding, by the receiver, the block data as a node to an index tree of multidimensional index structures based on information about each transaction in the transaction verification, wherein the received block data includes a first hash value generated from information about the number of nodes stored in the sender's index tree according to the multidimensional index structures.

In the method for providing a search function for blockchain according to another embodiment, in the index tree of multidimensional index structures, a search key may be a plurality of fields according to Point Access Method (PAM), and transaction data may comprise multidimensional points and be stored in a disk. Additionally, the index tree of multidimensional index structures is a balanced tree including nodes of a uniform size that is equal to a disk page size, and is preferably a 'K-D-B Tree'.

The method for providing a search function for blockchain according to another embodiment may further include calculating, by the receiver, the number of internal nodes stored in the receivers index tree additionally created after the transaction verification is completed and generating a second hash value from it, and verifying, by the receiver, integrity by comparing the first hash value included in the block data received from the sender and the second hash value generated by the receiver. In this instance, each of the first hash value and the second hash value may be calculated using information about an index tree created until a previous block, 'Merkle Root' for ensuring integrity of transaction information in a currently inputted block data, and the number of nodes after creating an index tree through the currently inputted block data.

The method for providing a search function for blockchain according to another embodiment may further include, when the integrity verification succeeds, verifying, by the receiver, a block header, and propagating, by the receiver, the block data to other user.

The method for providing a search function for blockchain according to another embodiment may further include, after the transaction verification is completed, calculating 'Merkle Root' based on transaction information.

Meanwhile, there is provided a computer-readable recording medium having recorded thereon a program for performing the above-described methods for providing a search function for blockchain on a computer.

To solve the above-described technical problem, a user device for blockchain according to still another embodiment of the present disclosure includes a communication unit to transmit and receive block data via a network, a processing unit to verify transactions included in the block data received through the communication unit, and add the block data as a node to an index tree of multidimensional index structures based on information about each transaction in the transaction verification, and a storage unit to store the index tree and the block data.

In the user device for blockchain according to still another embodiment, in the index tree of multidimensional index structures, a search key may be a plurality of fields according to Point Access Method (PAM), and transaction data may comprise multidimensional points and be stored in a disk. Additionally, the index tree of multidimensional index structures is a balanced tree including nodes of a uniform size that is equal to a disk page size, and is preferably a 'K-D-B Tree'.

In the user device according to still another embodiment, the block data received through the communication unit may include a first hash value generated from information about the number of nodes stored in a senders index tree according to the multidimensional index structures, and the processing unit may calculate the number of internal nodes stored in its index tree additionally created after the transaction verification is completed, generate a second hash value from it, and verify integrity by comparing the first hash value included in the block data received from the sender and the generated second hash value. In this instance, each of the first hash value and the second hash value may be calculated using information about an index tree created until a previous block, 'Merkle Root' for ensuring integrity of transaction information in a currently inputted block data, and the number of nodes after creating an index tree through the currently inputted block data.

In the user device according to still another embodiment, when the integrity verification succeeds, the processing unit may verify a block header, and propagate the block data to other user.

Advantageous Effects

The embodiments of the present disclosure adopt a tree index structure for providing a multi-search function, thereby providing various search functions without a performance decrease of the existing blockchain, and through this, improving electronic currency users' convenience and companies' data utilization solutions, and ensuring reliability of transaction data in blockchain as well as reliability of search results.

DESCRIPTION OF DRAWINGS

FIG. 1 is a diagram illustrating actual transaction data in an Internet of Things (IoT) platform (Daliworks).

Figure 2:
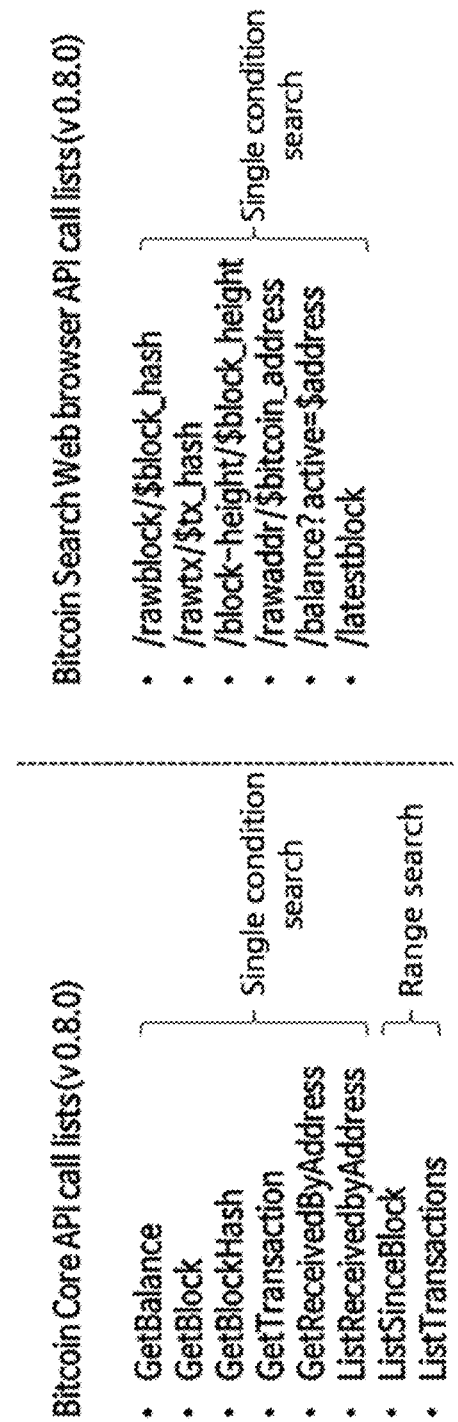
FIG. 2 is a diagram illustrating a bitcoin blockchain core and an application programming interface (API) for search of a web browser.

| [Detailed Description of Main Elements] | |
| --- | --- |
| 10: Sender | |
| 20: Receiver/User device | 21: Communication unit |
| 23: Processing unit | 25: Storage unit |
| 30: Other user | |
| 40: Network | |

BEST MODE

A method for providing a search function for blockchain according to an embodiment of the present disclosure includes receiving block data via a network; verifying transactions included in the received block data; and adding the block data as a node to an index tree of multidimensional index structures based on information about each transaction in the transaction verification.

A method for providing a search function for blockchain according to another embodiment of the present disclosure includes receiving, by a receiver, block data according to multidimensional index structures from a sender via a network; verifying, by the receiver, transactions included in the received block data; and adding, by the receiver, the block data as a node to an index tree of multidimensional index structures based on information about each transaction in the transaction verification, wherein the received block data includes a first hash value generated from information about the number of nodes stored in the sender's index tree according to the multidimensional index structures.

[Mode for Invention]

Hereinafter, the embodiments of present disclosure will be described in detail with reference to the accompanying drawings. However, in the following description and the accompanying drawings, a detailed description of known functions or elements that may render the key subject matter of the present disclosure ambiguous is omitted herein. In addition, the term 'comprises' when used in this specification, specifies the presence of stated elements, but does not preclude the presence or addition of one or more other elements unless the context clearly indicates otherwise.

Additionally, the terms "first", "second" and the like may be used to describe various elements, but the elements should not be limited by the terms. These terms are used to distinguish one element from another. For example, a first element may be referred to as a second element without departing from the scope of the present disclosure, and likewise, a second element may be referred to as a first element.

The terminology used herein is for the purpose of describing particular embodiments only, and is not intended to be limiting of the present disclosure. The singular forms as used herein are intended to include the plural forms as well, unless the context clearly indicates otherwise. It should be understood that the term "comprises" or "includes" when used in this specification, specifies the presence of stated features, integers, steps, operations, elements, components or groups thereof, but does not preclude the presence or addition of one or more other features, integers, steps, operations, elements, components or groups thereof.

Unless otherwise defined, all terms (including technical and scientific terms) used herein have the same meaning as commonly understood by those having ordinary skill in the technical field to which the present disclosure pertains. It is further understood that terms, such as those defined in commonly used dictionaries, should be interpreted as having a meaning that is consistent with their meaning in the context of the relevant art document, and will not be interpreted in an idealized or overly formal sense unless expressly so defined herein.

Figure 1:
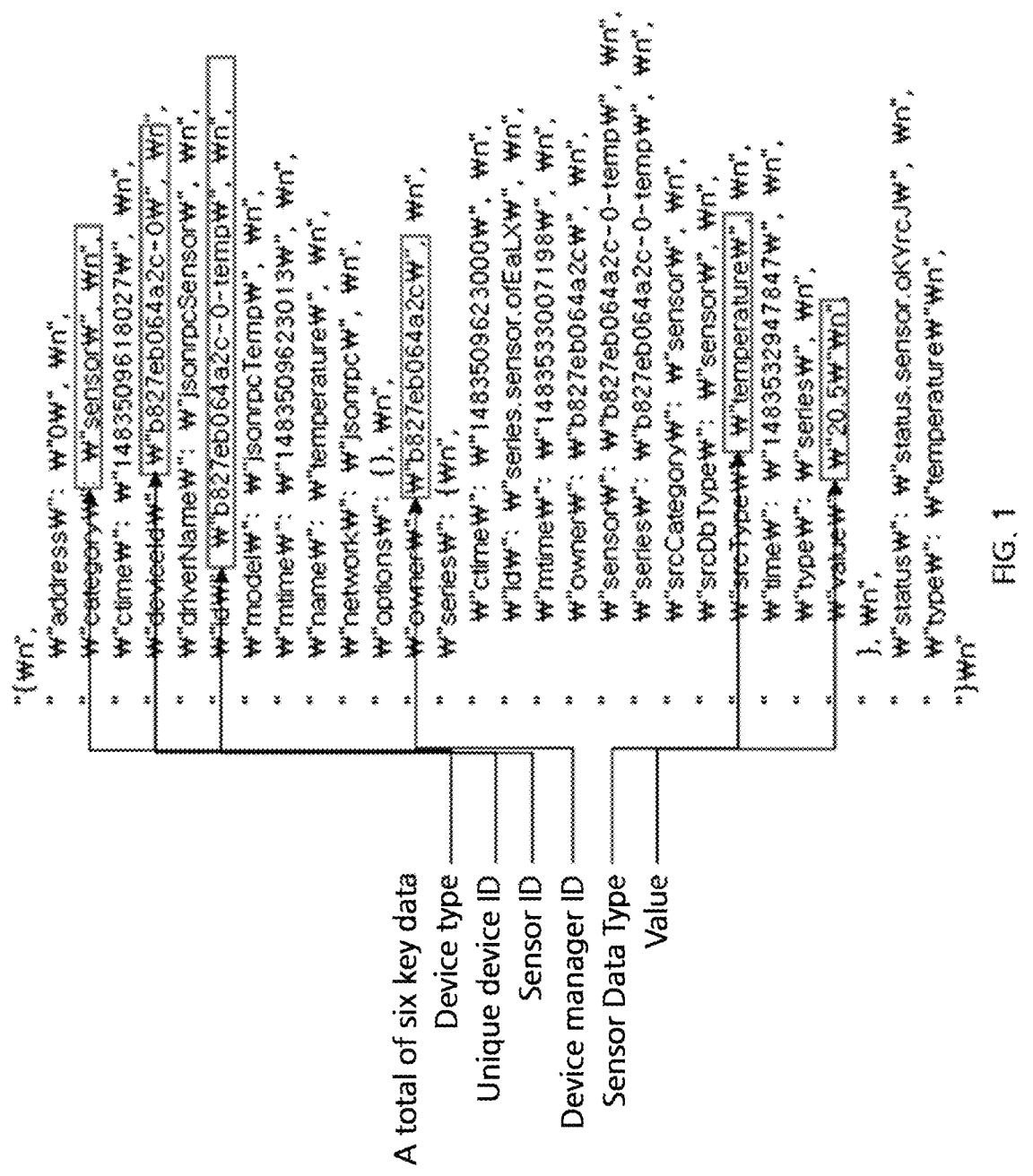

There is a need to provide various search functions for the application of technology to a variety of industrial environments. In the case of the existing bitcoin transaction data, four data fields may be used for search: Sender Address, Receiver Address, Value, and Timestamp. However, referring to FIG. 1 illustrating actual transaction data in an Internet of Things (IoT) platform (Daliworks), it can be seen that in the case of IoT environment, various types of data is included in one transaction. Among the various data, except overlapping information, there may be largely 6 to 8 data fields, and when applied on blockchain, there is a high possibility that a data field will be added. Additionally, in the case of IoT environment, one node is not managed by one user and many devices are managed by one user, and the user needs visualized information about device management.

Accordingly, to perform various search functions in IoT environment and address the limitation of the existing blockchain search, the embodiments of the present disclosure presented below propose a solution.

FIG. 2 is a diagram illustrating a bitcoin blockchain core and an application programming interface (API) for search of a web browser. As mentioned above, the existing blockchain provides a search function but has a functional limitation, and this limitation comes from the structural aspect of blockchain. First, referring to FIG. 2, the current blockchain structure is not easy for search. As its name indicates, blockchain is a structure in which blocks generated based on transactions received from users are linked in the form of a chain. This structure needs a linear search for a block and a linear search for the inside of the block to search for a specific transaction, resulting in inefficient search performance. The previous search work focuses on search through index information of data, but bitcoin or Ethereum currently available in the market provides a search for the block number, transactions and the block hash value through LevelDB, and index information only manages blocks through the block number and does not have indexes for transaction information, thereby failing to search for previous transaction information. Accordingly, the current bitcoin does not provide a multiple condition search or range search function provided by most of databases.

Additionally, the current structure has low connectivity between a database for managing information about blockchain and actual data, i.e., blockchain data. The cause of this phenomenon is low utilization of blocks generated in blockchain. In addition, since there is no solution to ensure integrity of a query result in a search node, reliability of the query result is low.

Figure 3:
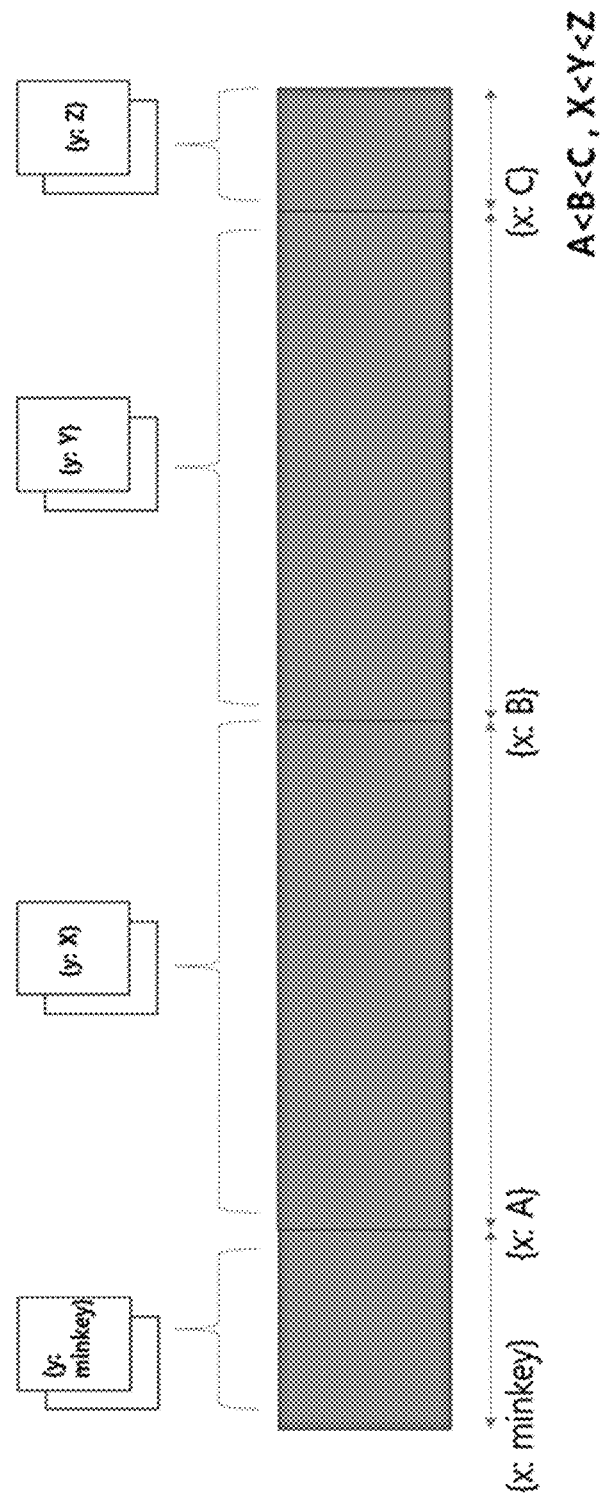
FIG. 3 is a diagram showing an array structure for multidimensional index management of MongoDB.

FIG. 3 is a diagram showing an array structure for multidimensional index management of MongoDB, and file generation for a block in blockchain has the following process. First, a user receives block data mined by other user. The user verifies the block data through LevelDB and updates the database using information necessary for transaction and mining. Additionally, the verified data is stored in a local disk in the form of a file (in the case of bitcoin, .dat). The blockchain data stored in the form of a file is stored to ensure integrity of the entire network, and actually, transaction verification and fetching of previous block header information is performed through the database. Accordingly, data in the form of a file is only used when search takes place. Accordingly, since the search function is not a main part of the current blockchain platform, having indexes for transaction information is not an essential element.

The search limitation of the node itself naturally induces the generation of a third party for providing a search function, and its reliability problem may occur. Currently, in the case of bitcoin, there are about 20 specialized search websites, and in the case of Ethereum, 5 specialized search websites. Bitcoin users actually verify most of transaction information via the websites. The search websites provide transaction information through reprocessing of blockchain data stored in one node and data received via the network to provide a search function. However, when transaction data is forged or falsified during reprocessing and the invalid transaction information is transmitted to the user, the user cannot verify it immediately. Additionally, even though forgery/falsification is found, to verify transaction information, it is necessary to manually compare through directly accessing blockchain data. Additionally, like the core program described above, the current search website does not provide a range search or multiple condition search function, and API that provides such a search function shows a low level of throughput of 3 per second.

"Etherql: A Query Layer for Blockchain System" research is an approach to provide various search functions by using MongoDB, not LevelDB, in order to solve the limitation of the search function in the existing Ethereum. To add a new search layer, it largely implements the following four: Sync manager, Handler Chain, Persistence Framework, Developer Interface. Sync manager functions to maintain the same blockchain data with other nodes in Ethereum blockchain, and a fork occurs, deals with it. Handler Chain redefines information included in blocks according to the SQL scheme. Persistence Framework transmits and processes a query through connection with MongoDB as per the user's search request. Lastly, Developer Interface allows developers to process broader blockchain data through Rest API. As a result of research, it is found that the throughput is higher than LevelDB in the field of one-dimensional search, and range search of sufficient performance is possible.

The use of MongoDB provides various search functions, but there is a performance limitation for use in the multiple condition search scenario. First, in the case of MongoDB, indexes are a B-Tree with buckets to improve the search performance. However, the B-Tree focuses on one-dimensional data processing in the same way as the existing binary tree, and for two or higher dimensional data processing, its index structure has an array structure shown in FIG. 3. In this structure, the time complexity for multiple condition processing is O(N), and the performance is not much different from linear search for the existing blockchain data. Accordingly, a significant performance improvement cannot be expected from MongoDB in complex search scenarios.

Additionally, fast performance through memory-based index tree management is an advantage, but it is not suitable for the characteristics of IoT devices having a small memory size, and due to the increasing memory size without deletion like blockchain, a lack of memory size may occur.

Additionally, to connect the index tree and blockchain file data, it requires an additional table for storing index information, not an address value of external data, and managing an index result value and an address value, and to fetch the search result, a disk access is required in the same way as a disk-based service.

Lastly, a reliability problem of search results may occur. Currently, the search result value obtained through the database of the nodes has unconditional trust due to search for already verified data, but due to the characteristics of blockchain having the security of the entire network as its advantage, security of one node is not ensured. Accordingly, currently, there is no reliability solution for perfectly guaranteeing the search result value.

Hereinafter, a blockchain search module for multiple condition search designed based on the understanding of the above-described problem is proposed. Accordingly, the embodiments of the present disclosure present an approach to provide various search functions without a big structural change in the existing blockchain and ensure integrity.

First, to provide various search functions, the search functions are provided by adding an index tree for transaction information, not a database. This method can support various search scenarios by solving the limitation of the existing blockchain, namely, the problem with the absence of index management for transaction information. Additionally, it is possible to ensure reliability of search results to the user' search request by adding an approach to ensure integrity for blockchain transaction data. Lastly, even after the additional search module as the result of the present disclosure is mounted, a performance decrease does not occur compared to the existing system.

(1) Search Module Architecture

The reason why the search layer can be added without a structural change in the existing blockchain is because the current structure is separated by function. In general, a blockchain structure includes a data layer, a network layer, a consensus layer and an encryption layer. Among them, those directly associated with search and blockchain file data are the data layer and the network layer. The data layer serves to store block data verified by the database in the form of a file, or record verified transactions in Mempool (a temporary transaction storage). The network layer serves to transmit or receive block or transaction data while maintaining connection with other nodes and transmit the data to the database. Currently, processing between the network layer and the data layer is only performed through the database (LevelDB), while the structure of FIG. 4 can provide various search functions by adding an index tree.

Figure 4:
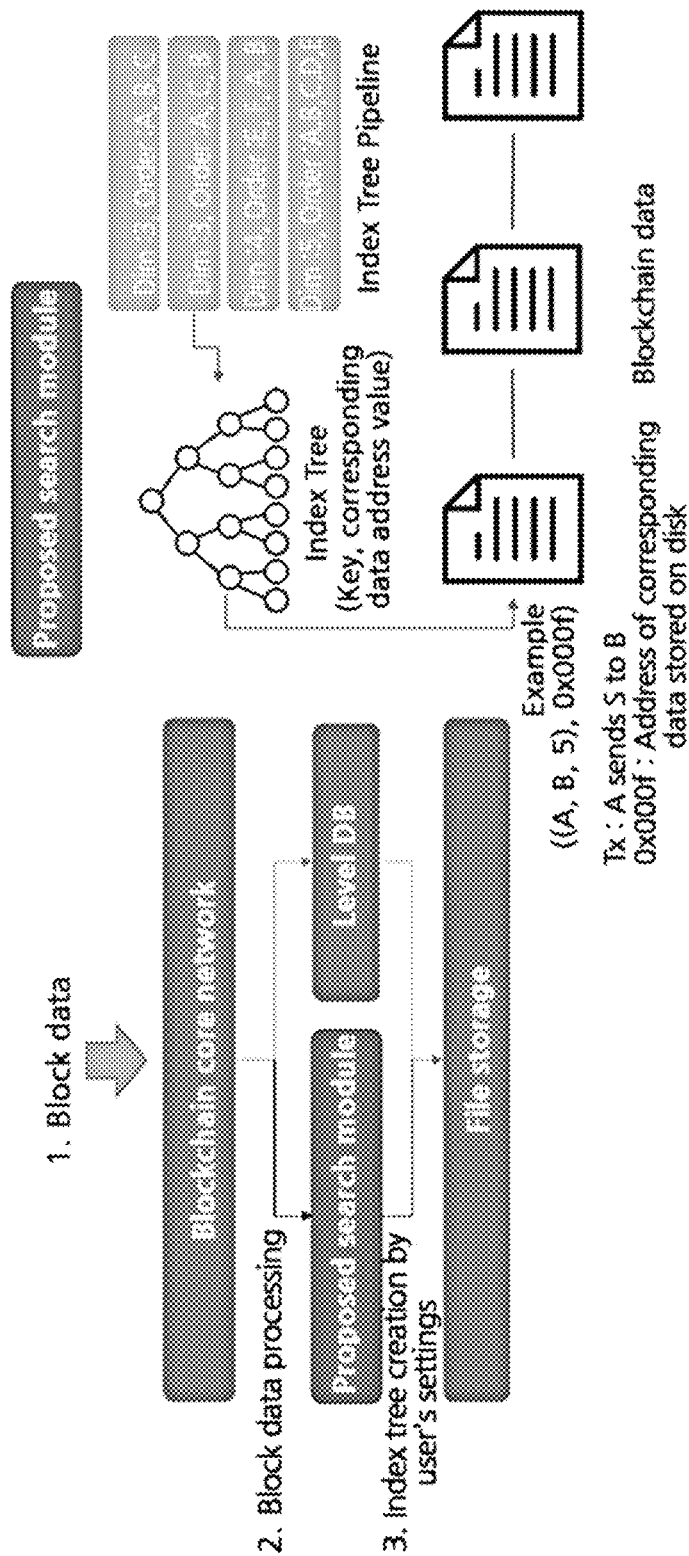
FIG. 4 is a whole configuration diagram showing a search structure and a search scheme according to an embodiment of the present disclosure.

FIG. 4 is a whole configuration diagram showing a search structure and a search scheme according to an embodiment of the present disclosure, and shows index processing without a big change in the data processing process on the existing blockchain.

STEP 1: Receive block data generated (mined) by other user via the network layer.

STEP 2: Verify transactions included in the block.

STEP 3: Updates Mempool used for the transaction verification.

STEP 4: Add the block data as a node to the index tree based on information about each transaction in the transaction verification.

STEP 5: After the transaction verification is completed, calculate Merkle Root based on transaction information, and along with this, verify the block header.

STEP 6: Store the verified block data in the local disk via the data layer.

The process actually added for index processing in the verification process is only STEP 4. Accordingly, it is found that processing is possible without a great overhead in the existing processing process. Additionally, it is possible to increase reliability and maintain system performance by index tree verification based on data used for verification.

It is possible to ensure connectivity between blockchain file data and the database pointed out as the limitation of the existing blockchain and implement without a structural or functional change in the existing data layer or network layer.

Additionally, it is possible to reconfigure the index tree according to search scenarios to ensure the search performance according to the user's selection. As it takes a considerate amount of time to reconfigure the index tree with high capacity blockchain data, a suitable index tree for the users desired scenario is set at the first stage. In particular, performance differs depending on the values of keys stored in the index tree and an order in which the keys are stored due to the characteristics of multiple condition search. For example, when the user needs a search function for a time range and a temperature value, in case that the index tree includes a receiver address, a sender address, a humidity value, a device manager, a time and a temperature value, it is necessary to descend down to the deepest level in the index tree to search the desired data field in order to find the user's desired data.

(2) Index Tree Configuration

As mentioned above, it is necessary to configure the index tree for processing of the multiple condition search scenario. According to an embodiment of the present disclosure, it is the most suitable that the structure of the index tree is formed through a 'K-D-B tree'. The K-D-B tree is the most suitable for blockchain data management among the research works of multidimensional indexing in the existing databases. The multidimensional index (Multidimensional Access Method) research is largely classified into Point Access Method (PAM) and Spatial Access Method (SAM). PAM is a method used when transaction data comprising points such as blockchain transaction information is stored in the database, and SAM is used for data processing of various figures and geometric information. PAM may be largely classified into four technologies, K-D Tree, QuadTree, Grid File and K-D-B Tree.

In the process of implementing the embodiments of the present disclosure, the K-D-B Tree is found the most suitable for blockchain data processing among the four typical technologies. The K-D-B Tree is a combined structure of the characteristics of K-D Tree and B-Tree. It is suitable for processing of high capacity blockchain data, and especially, it is noted that an IoT sensor has the limited memory capacity to process the increasing amount of data. Accordingly, it is essential to use a disk-based index tree with higher capacity at lower costs. Additionally, in the case of K-D Tree, it has the memory-based feature and data may concentrate on a tree at one side, and in this case, a decline in depth and performance of the tree to be managed may occur. Accordingly, among the disk-based multidimensional index technologies, QuadTree, Grid File and K-D-B Tree, an index tree should be selected. QuadTree is a 4-way tree structure in which the tree is built in four directions, SE, SW, NE, NW. Grid File implements indexes through space partitioning in the same way as K-D tree, but allows access to the indexes through hash calculation. According to an embodiment of the present disclosure, it is found that among the above three technologies, K-D-B Tree has the best processing performance of three or higher dimensional data. Accordingly, K-D-B Tree is selected as the most suitable index tree for blockchain data processing.

Figure 5:
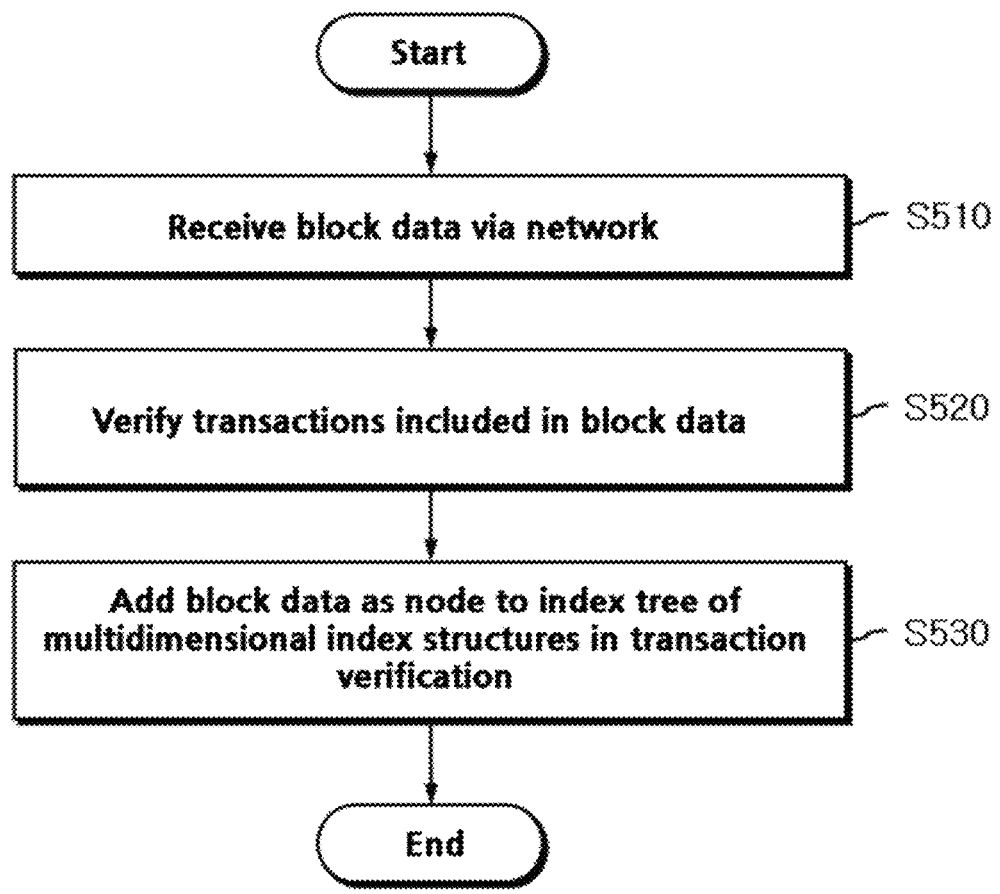
FIG. 5 is a flowchart showing a method for providing a search function for blockchain according to an embodiment of the present disclosure.

FIG. 5 is a flowchart showing a method for providing a search function for blockchain according to an embodiment of the present disclosure, and shows a schematic reconstruction of the process of providing a search function shown in FIG. 4.

In the step S510, a device for providing a search function for blockchain receives block data via a network.

In the step S520, the device verifies transactions included in the block data received through the step S510. Subsequently, in the transaction verification, a process of updating 'Mempool' that stores unconfirmed transactions may be further performed.

In the step S530, the device adds the block data as a node to an index tree of multidimensional index structures based on information about each transaction in the transaction verification.

In this instance, in the index tree of multidimensional index structures, the search key may be a plurality of fields according to Point Access Method (PAM), and transaction data may comprise multidimensional points and be stored on disk. In particular, the index tree of multidimensional index structures is a balanced tree including nodes of a uniform size that is equal to the disk page size, each node is stored in a page, the internal node is responsible for a region in the multidimensional space, the leaf node is responsible for storing data page information, and each transaction data is preferably a data structure located in a search space along an index node indicating a space to which each transaction data belongs. Each node is stored in a page for efficiency of input and output, and the search space may be split into two subspaces according to the domain value comparison results of one field. As the index tree of multidimensional index structures, for example, a 'K-D-B Tree' may be selected and used.

Meanwhile, after the transaction verification is completed, 'Merkle Root' may be calculated based on transaction information, and the block header may be verified. Subsequently, the transaction verified block data may be stored in the local disk.

Figure 6:
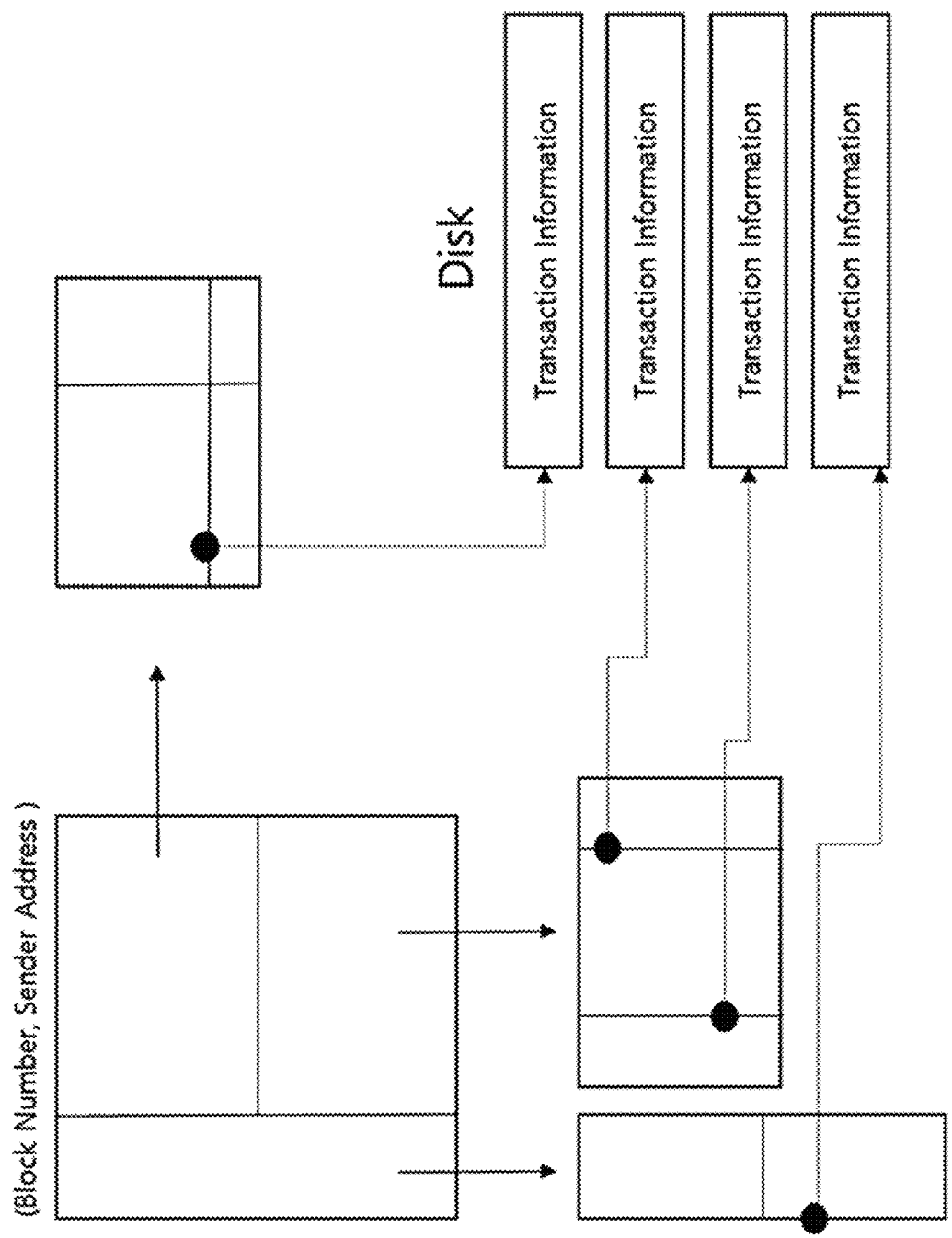
FIG. 6 is a diagram illustrating a K-D-B Tree which is an index tree used for blockchain data processing proposed by embodiments of the present disclosure.

FIG. 6 is a diagram illustrating a K-D-B Tree which is an index tree used for blockchain data processing proposed by embodiments of the present disclosure. As mentioned above, the main role of an index tree is to easily transmit an index for transaction information included in blockchain file data. To this end, it is necessary to define a value stored in the node structure (Key, Value) of the K-D-B Tree. As mentioned above, Key defines a suitable key value and order according to scenario. Value stores a current position value of transaction information in blockchain file data.

The time taken to create the index tree has complexity of O(NlogN) for N data at the time of initial creation, and in this case, the median of medians algorithm is used. For K-dimensional data, in the case of insertion, the complexity is O(log N), and in the case of search, the complexity is $O(N^{1-1/k}+M)$.

(3) Approach to Ensure Search Data Integrity

Blockchain technology keeps its own data equal to data of all network users. Accordingly, Blockchain technology itself can verify data received from other user through a distributed ledger (blockchain file data) that stores data, and the verification result is trustworthy.

In the case of search, a request for blockchain data is sent and its result value is given. Accordingly, as mentioned above, it is thought that blockchain file data stored through blockchain technology is basically trustworthy. In conclusion, when the search request and the value being returned are not forged or falsified, it is possible to provide a search function while maintaining security. It is said that the existing websites that provide a search function cannot have reliability of these two and that is the limitation.

So, in the structure proposed by the embodiments of the present disclosure, the index tree for processing a search request is to be intensively managed to prevent forgery/falsification. It is possible to ensure reliability of search by maintaining the same index tree with other user like the existing approach to maintain security in blockchain. However, the user's index tree is differently created depending on various scenarios, and finally, it is necessary to ensure matching between index trees, not the same structure.

When index trees are different but have the same input value (transaction information) and thus the result values are the same, stored data may be considered to be equal. In case that index trees are different but have the same input value and thus the result values are the same, the only case is the number of nodes stored in the index trees. When the user creates an index tree with 5000 transactions stored in blockchain, the tree will have 5000 internal leaf nodes no matter how its internal structure is. Accordingly, the following Equation 1 for ensuring integrity of the index tree may be obtained based on such information.

Index_Tree_Hash=Hash(Previous_Index_Tree_Hash+ Merkle Root+Tree's node count) [Equation 1]

Previous_Index_Tree_Hash is information about the index tree created until the previous block. Merkle Root is a value that ensures integrity for a transaction input value, and ensures integrity of transaction information in the currently inputted block data. This is a value calculated by the existing blockchain verification process. Tree's Node Count is a value that comes after creating the index tree through the inputted block data, and ensures the creation of the valid index tree. Finally, Index_Tree_Hash is stored in the existing block header information, and identifies that all users have the same index tree through the Index_Tree_Hash value.

All users may be allowed to calculate equally like the existing calculation mechanism on blockchain, and through this, allow all network users to maintain the same index tree information.

The processing process on the network's side for creating an index tree is as follows.

STEP 1: A block creator (miner) includes unconfirmed transactions in a temporary block, updates its own index tree based on it, and propagates a succeeded block to the network through the existing blockchain mining calculation including Equation 1.

STEP 2: Other network participants having received the mined block verify the block.

STEP 3: When verification of each transaction included in the block succeeds, insert into the index tree, and after final transaction verification, records Merkle_RootUser.

STEP 4: Return the number of internal nodes (Tree_Node's_CountUser) stored in the index tree additionally created after transaction verification is completed.

STEP 5: Check integrity between the mined block and the existing data through calculation using the following equation based on it.

Index_Tree_HashMiner=Hash(Previous_Index_Tree_HashUser+Merkle RootUser+Tree's node countUser) [Equation 2]

That is, the sender, for example, the block creator includes information of the index tree in block generation according to Equation 1 presented above and transmits the corresponding block data, and the receiver updates the index tree through transaction information included in the block received from the sender, and returns the number of nodes in the index tree created after updates. As a result, integrity of the index tree created by the receiver may be verified by checking if the hash value of Equation 1 and the hash value of Equation 2 match. When the two do not match, the created index tree may be changed back to the existing index tree.

STEP 6: When the same Index_Tree_Hash is returned as a result of calculation, verify the entire block header and propagate the block to other user.

Figure 7:
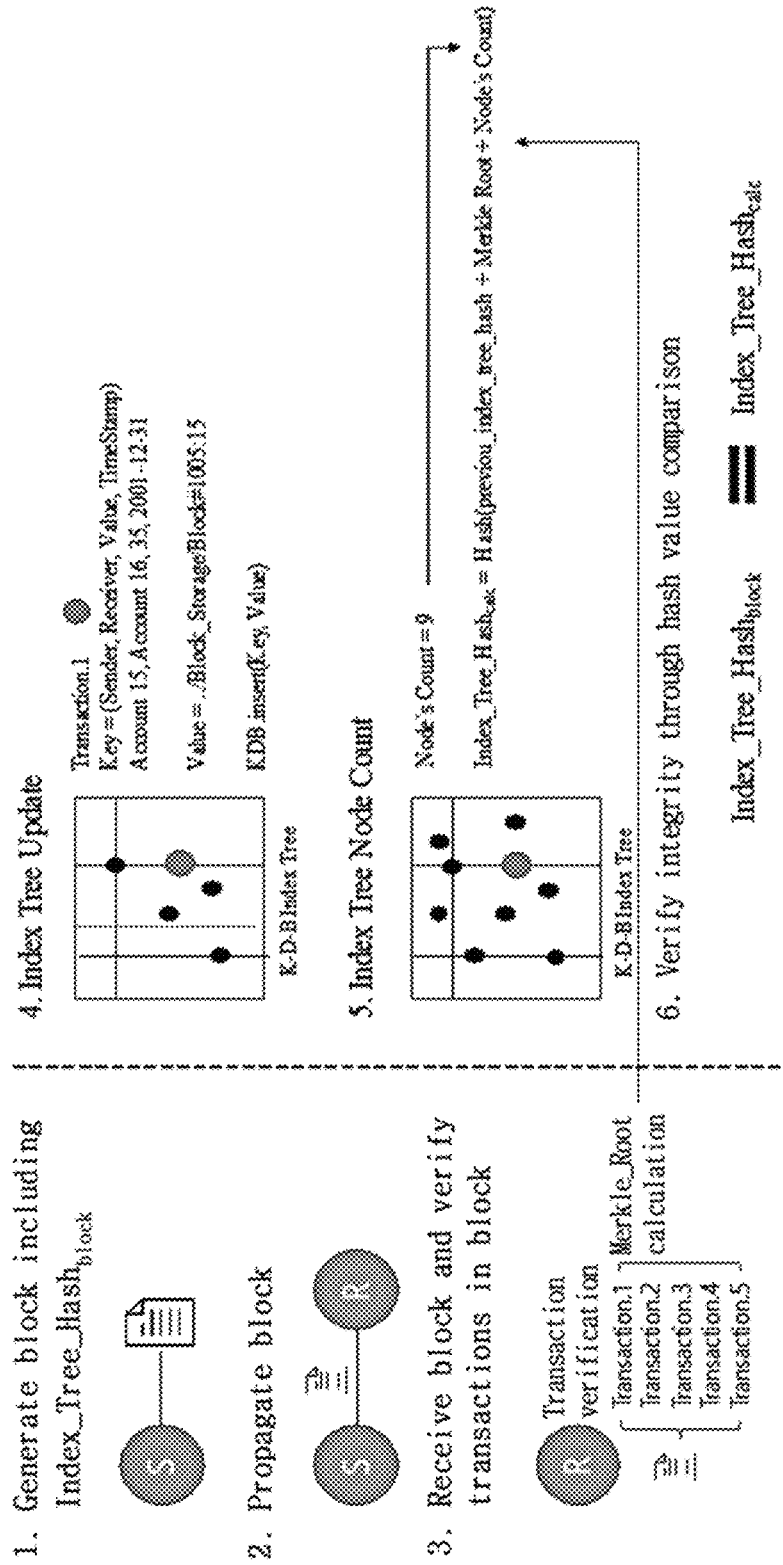
FIG. 7 is a diagram explaining a verification process for ensuring integrity of an index tree according to embodiments of the present disclosure.

An example of the above process is as shown in FIG. 7, and FIG. 7 shows a series of verification processes for ensuring integrity of an index tree according to the embodiments of the present disclosure.

The series of processing processes of a method for providing a blockchain search function for ensuring integrity is summarized as below.

First, a receiver receives block data according to multidimensional index structures from a sender via a network. In this instance, the received block data includes a first hash value generated from information about the number of nodes stored in the sender's index tree according to the multidimensional index structures.

Subsequently, the receiver verifies transactions included in the received block data, and adds the block data as a node to an index tree of multidimensional index structures based on information about each transaction in the transaction verification. Of course, in the index tree of multidimensional index structures, the search key may be a plurality of fields according to Point Access Method (PAM), and transaction data may comprise multidimensional points and be stored on disk. In particular, the index tree of multidimensional index structures is a balanced tree including nodes of a uniform size that is equal to the disk page size, and is preferably a 'K-D-B Tree'.

Additionally, the receiver may calculate the number of internal nodes stored in its own index tree additionally created after the transaction verification is completed, generate a second hash value from it, and verify integrity by comparing the first hash value included in the block data received from the sender and the second hash value generated by the receiver.

In this instance, each of the first hash value and the second hash value may be calculated using information about the index tree created until the previous block, 'Merkle Root' for ensuring integrity of transaction information in the currently inputted block data, and the number of nodes after creating the index tree through the currently inputted block data.

Meanwhile, when the integrity verification succeeds, the receiver verifies the block header, and propagates the block data to other user. Additionally, after the transaction verification is completed, a process of calculating 'Merkle Root' based on the transaction information may be further included.

Figure 8:
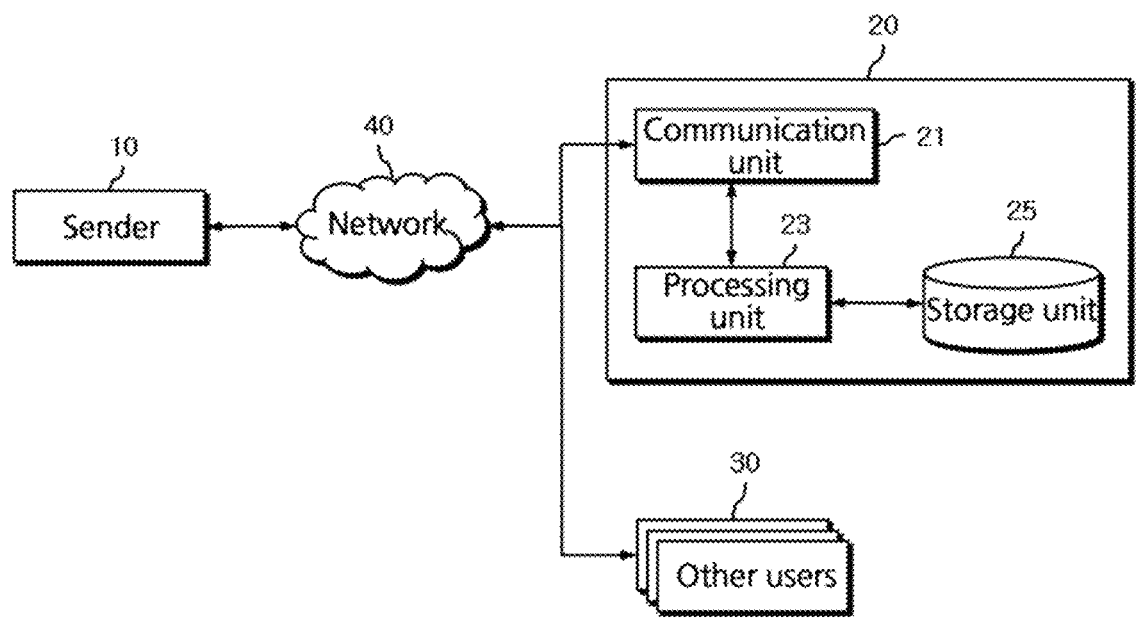
FIG. 8 is a block diagram showing a device for providing a search function for blockchain according to another embodiment of the present disclosure.

FIG. 8 is a block diagram showing a device for providing a search function for blockchain according to another embodiment of the present disclosure, and is a reconfiguration of the above-described process of FIG. 5 from the perspective of hardware configuration. Accordingly, the function of each element will be briefly described to avoid redundant description.

The user device 20 for a blockchain includes a communication unit 21, a processing unit 23 and a storage unit 25, and may be connected to a sender 10 and other users 30 via a network 40.

The communication unit 21 is configured to transmit and receive block data via the network 40.

The processing unit 23 verifies transactions included in the block data received through the communication unit 21, and adds the block data as a node to an index tree of multidimensional index structures based on information about each transaction in the transaction verification. Here, in the index tree of multidimensional index structures, the search key may be a plurality of fields according to Point Access Method (PAM), and transaction data may comprise multidimensional points and be stored on disk. In particular, the index tree of multidimensional index structures is a balanced tree including nodes of a uniform size that is equal to the disk page size, and is preferably a 'K-D-B Tree'.

The storage unit 25 is a means for storing the index tree and the block data.

The block data received through the communication unit 21 includes a first hash value generated from information about the number of nodes stored in the sender's index tree according to the multidimensional index structures, and the processing unit 23 may calculate the number of internal nodes stored in the index tree additionally created after the transaction verification is completed, generate a second hash value from it, and verify integrity by comparing the first hash value included in the block data received from the sender 10 and the generated second hash value. In this instance, each of the first hash value and the second hash value may be calculated using information about the index tree created until the previous block, 'Merkle Root' for ensuring integrity of transaction information in the currently inputted block data, and the number of nodes after creating the index tree through the currently inputted block data.

Meanwhile, when the integrity verification succeeds, the processing unit 23 may verify the block header, and propagate the block data to other user 30.

(4) Experiment and Verification

As proposed by the embodiments of the present disclosure, it is experimentally verified that it is possible to provide various search functions through an added search module without a big structural change in the existing blockchain, and it is possible to use without a big difference in performance compared to the existing databases.

To this end, the experiment is conducted by comparison and evaluation with MongoDB proposed by related research in terms of the performance of search result return according to various search scenarios, for example, multiple condition search and range search, and comparison of the index tree creation time and the MongoDB creation time to verify that a performance decrease does not occur compared to the existing blockchain. In particular, in the case of multiple condition search, as mentioned above, a K-D-B Tree has highest efficiency of three or higher dimensional search and thus works in three or higher dimensional scenario.

The experiment is conducted in PC environment of i5-6500K, 16 g ram, Sandisk 256G SSD, Window 8.1 64 bit. For performance comparison of the MongoDB and the K-D-B Tree, the same environment (Node.js) and programming language (Javascript) was implemented. The performance evaluation involves evaluating the time taken to return a result value after a search query according to the scenario, and for experimental data, 150,000 transaction data is used by adding an arbitrarily generated Data value to the data structure provided by the actual IoT platform Daliworks. Additionally, for the experiment, constraints are set as below. To prevent a data change caused by a blockchain fork, the experiment is conducted under the assumption that a Delegated Proof of Stake (DPoS) consensus algorithm is used in which a fork is not produced. Through this, in the K-D-B Tree, deletion of the index tree is not considered.

An example of multiple condition search request according to the scenario is as below.

Company A manages data through IoT devices installed in the workplace, and when it finds a value outside of a predetermined condition as per customers' request, notifies a warning to the customers. For sake of convenience in managing the IoT devices, 100 IoT sensors are managed through gateway devices, and data reliability is achieved through a blockchain network between gateway devices.

To find a transaction outside of the predetermined condition of the customer, gateway nodes periodically verify the generated data in blockchain. As a typical example, a search scenario "among transactions sent from IoT device X to gateway B in charge, search and return all transactions having a temperature value of 1.9 or above" is written, and a search is conducted through a search module. Based on the approach used in the embodiments of the present disclosure, this is expressed as below.

K-D-B Tree

Ex) kdb.query([X's address], [Y's address], [1.9,])

MongoDB

Ex) db.collection("tree").find({'sender address': X's address, 'receiver_address': Y's address, 'temp': {'$gt': 1.9 }}

Hereinafter, MongoDB used in studying the existing blockchain related search and K-D-B Tree are created and their search performance is compared and analyzed. To this end, the experiment is conducted by generating 150,000 transaction data in the MongoDB and the K-D-B Tree to build each table, and rebuilding the table through additional block insertion. Additionally, the time taken to return a search result according to various search scenarios is evaluated to verify the embodiments of the present disclosure.

As mentioned above, the final objective of the embodiments of the present disclosure is to provide various blockchain search scenarios without a performance change in the existing blockchain system. Accordingly, after comparison and evaluation of various blockchain search scenarios between LevelDB used in the existing blockchain system and MongoDB found as having higher performance than LevelDB in the same condition, results fit for the objective are anticipated.

First, the experiment is conducted in the case of receiving the existing blockchain data through synchronization with other nodes at the time of initial participation in blockchain. In this case, processing of a large amount of data is required, and in general, it is known that in the case of bitcoin, there are about 200,006,000 transactions, and it takes 4 to 5 days (432,000 sec) for synchronization. The time includes the processing time of transaction data in LevelDB.

Figure 9:
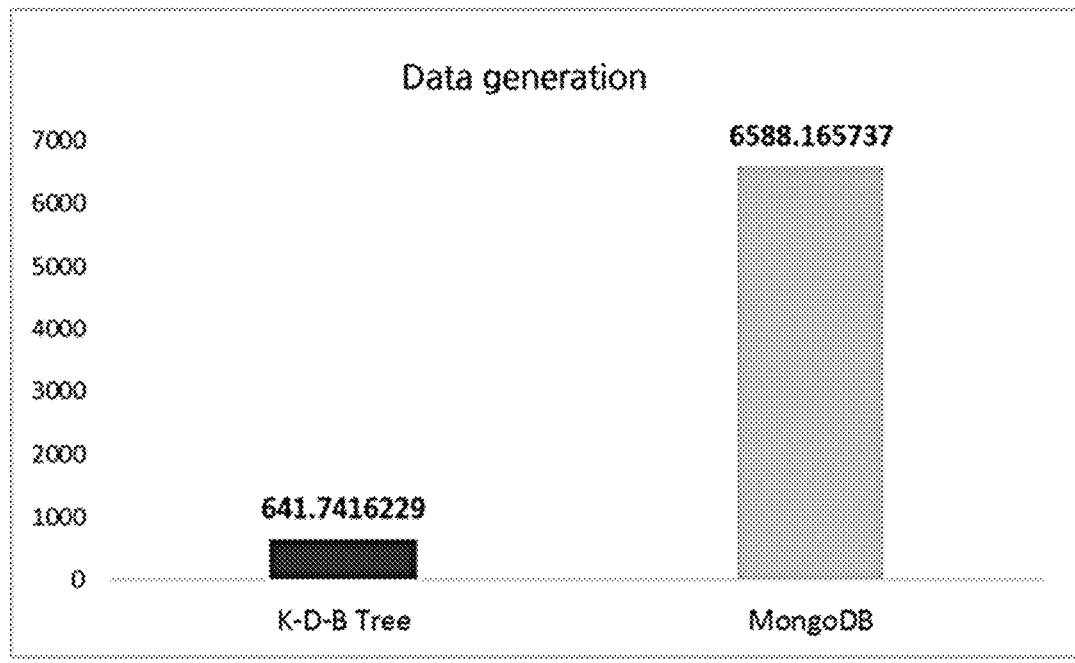
FIG. 9 shows an experimental example for comparing the time taken to create an index tree through prototyping according to embodiments of the present disclosure.
Figure 10:
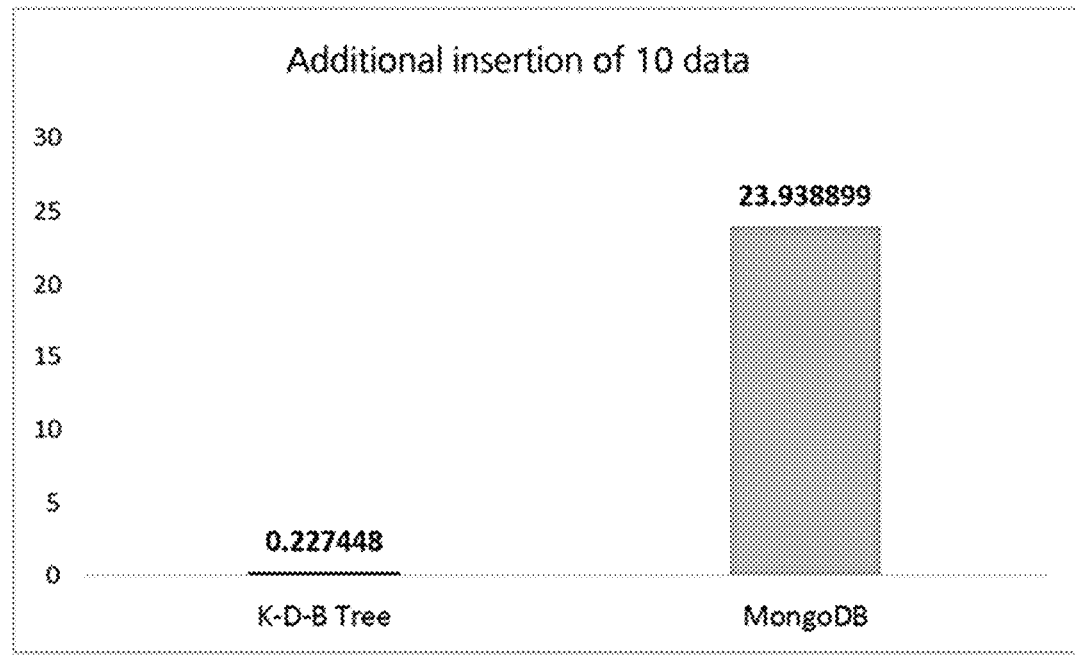
FIG. 10 shows an experimental example for comparing the time taken to additionally insert 10 data into an index tree through prototyping according to embodiments of the present disclosure.

FIG. 9 shows an experimental example for comparing the time taken to create an index tree through prototyping according to embodiments of the present disclosure. As shown in FIG. 9, it is found that the K-D-B Tree can be created within a shorter time (641 msec) than the time (6588 msec) required in the existing blockchain. FIG. 10 shows an experimental example for comparing the time taken to additionally insert 10 data into an index tree through prototyping according to embodiments of the present disclosure, the same is the case with updates of a block additionally created after initial blockchain data synchronization as shown in FIG. 10. As above, there are significant performance improvements in blockchain data synchronization and updates. It will be applied as an approach to solve the existing blockchain synchronization time problem to some extent.

Subsequently, there are experimental results of various search scenarios that are the main subject of the embodiments of the present disclosure. First, there are experimental results of simple search provided in the existing blockchain and range search scenario used in the related research.

Figure 11:
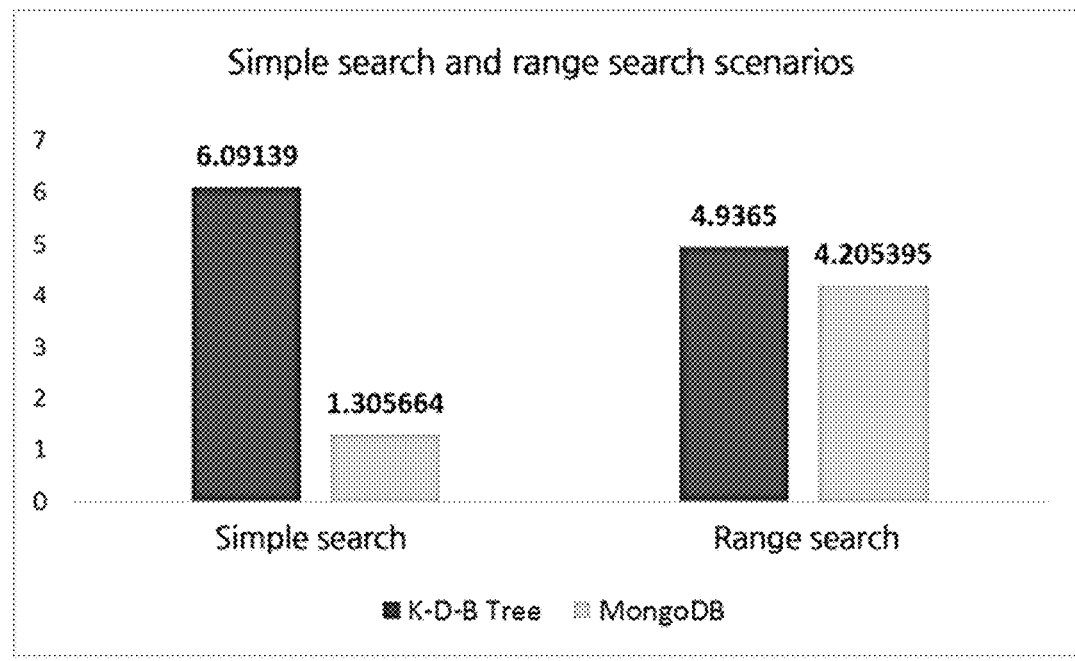
FIG. 11 shows an experimental example for comparing the performance of simple search and range search scenarios through prototyping according to embodiments of the present disclosure.

FIG. 11 shows an experimental example for comparing the performance of simple search and range search scenarios through prototyping according to embodiments of the present disclosure. As shown in FIG. 11, in the case of simple search scenario, from the experiment through a hash value of transaction, it can be seen that K-D-B Tree has lower performance than MongoDB. This is because B-Tree index tree used for simple search in MongoDB is fitter for simple search than K-D-B Tree. In the case of B-Tree, the time complexity needed for search is O(log N), and the search time complexity of K-D-B Tree for one-dimensional data is O(N), exhibiting a reasonable result. However, in the case of range search, it can be seen that similar levels of results are produced for the same request as shown above.

Figure 12:
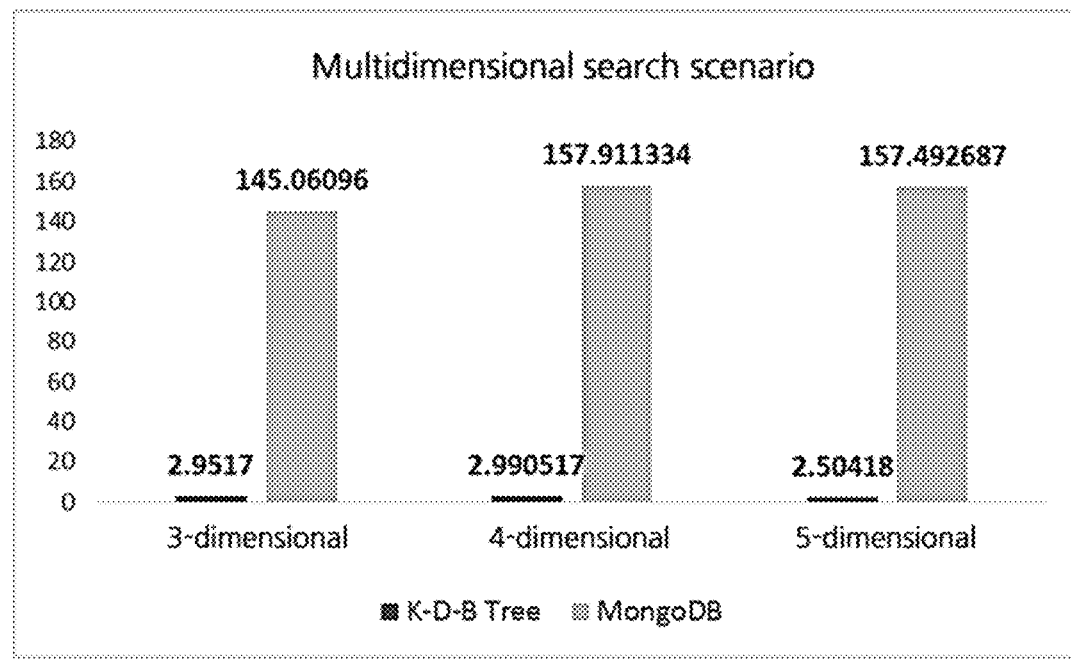
FIG. 12 shows an experimental example for comparing the multidimensional search performance through prototyping according to embodiments of the present disclosure.

Finally, there are the results of multidimensional search scenario best showing the characteristics of K-D-B Tree. FIG. 12 shows an experimental example for comparing the multidimensional search performance through prototyping according to embodiments of the present disclosure. As can be seen from FIG. 12, the results in multidimensional search show a big difference. There is a performance difference since it is not a memory based index tree which is an advantage in MongoDB. Additionally, in the case of MongoDB, since the index tree is an array type as mentioned above, the performance in multidimensional search is low. However, in the case of K-D-B Tree, the search speed is improved by narrowing the scope of multidimensional search for each search unit. It is noteworthy that in the case of experiment of four-dimensional and five-dimensional data, five-dimensional data is generated by addition to the search request used in four-dimensions, and the two experiments identify that there is no performance change between four-dimensional and five-dimensional search because search was completed in four-dimensions. Through this, it can be seen that the search performance may change with a change in the order of keys used in the experiment, and definition of the key values used in the search is important.

According to the experimental results, it can be seen that there is a difference in search performance depending on various search scenarios. Accordingly, blockchain developers may select a suitable database or index tree for their business. As a result, with regard to the difference between the earlier research and the embodiments of the present disclosure, the results are obtained as shown in Table 1.

TABLE 1

| Indexing method | LevelDB Key-Value Map | MongoDB B-Tree | Proposed approach K-D-B Tree |
|---|---|---|---|
| Simple search performance | ○ | ○ | ▲ |
| Range search performance | X (Not support) | ○ | ○ |
| Multiple condition search performance | X (Not support) | ▲ | ○ |
| Supporting language | Python, Javascript, C++ | Javascript, C++, Python | Javascript |
| Disk based or non-disk based | ○ | X (Memory based) | ○ |

As proved through the experiments, the K-D-B Tree proposed by the embodiments of the present disclosure may provide various search functions without a performance decrease of the existing blockchain. Through this, it is possible to improve bitcoin and Ethereum users' convenience and companies' data utilization solutions. Additionally, it is possible to provide developers with opportunities for various types of businesses through the increasing amount of data in blockchain. Additionally, there is an advantage that it is possible to ensure reliability of blockchain transaction data as well as reliability of search results that has never been before.

Meanwhile, the embodiments of the present disclosure may be implemented in computer-readable code in a computer-readable recording medium. The computer-readable recording medium includes all types of recording devices in which data that can be read by a computer system is stored.

Examples of the computer-readable recording medium include ROM, RAM, CD-ROM, magnetic tape, floppy disk, and optical data storage devices. Additionally, the computer-readable recording medium is distributed over computer systems connected via a network, and may store and execute the computer-readable code in a distributed manner. Additionally, a functional program, code and a code segment for implementing the present disclosure will be easily inferred by programmers in the technical field to which the present disclosure pertains.

The present disclosure has been hereinabove described with regard to various embodiments. Those having ordinary skill in the technical field to which the present disclosure pertains will understand that the present disclosure may be embodied in modified form without departing from the essential features of the present disclosure. Therefore, the disclosed embodiments should be considered in descriptive sense rather than in limiting sense. The scope of the present disclosure is defined in the appended claims rather than the foregoing description, and it should be interpreted that the present disclosure covers all differences within the equivalent scope.

INDUSTRIAL APPLICABILITY

The embodiments of the present disclosure adopt a tree index structure for providing a multi-search function, thereby providing various search functions without a performance decrease of the existing blockchain, and through this, improving electronic currency users' convenience and companies' data utilization solutions, and ensuring reliability of transaction data in blockchain as well as reliability of the search results.

The invention claimed is:

1. A method for providing a search function for blockchain, comprising:
receiving block data via a network;
verifying transactions included in the received block data; and
adding the block data as a node to an index tree of multidimensional index structures based on information about each transaction in the transaction verification, wherein the index tree of multidimensional index structures is a balanced tree including nodes of a uniform size that is equal to a disk page size, each node is stored in a page, an internal node is responsible for one region in a multidimensional space, a leaf node stores data page information, transaction data is located in a search space along an index node indicating a space to which each transaction data belongs, and wherein in the index tree of multidimensional index structures a search key is a plurality of fields according to Point Access Method (PAM).

2. The method for providing a search function for blockchain according to claim 1, wherein, in the index tree of multidimensional index structures, the transaction data comprises multidimensional points and is stored in a disk.

3. The method for providing a search function for blockchain according to claim 1, further comprising:
updating 'Mempool' that stores unconfirmed transactions, in the transaction verification.

4. The method for providing a search function for blockchain according to claim 1, further comprising:
after the transaction verification is completed, calculating 'Merkle Root' based on transaction information, and verifying a block header.

5. The method for providing a search function for blockchain according to claim 1, further comprising:
storing the transaction verified block data in a local disk.

6. A non-transitory, computer-readable recording medium having recorded thereon a program that, when executed by at least one processor, causes the at least one processor to perform the method according to claim 1.

7. A method for providing a search function for blockchain, comprising:
receiving, by a receiver, block data according to multidimensional index structures from a sender via a network;
verifying, by the receiver, transactions included in the received block data; and
adding, by the receiver, the block data as a node to an index tree of multidimensional index structures based on information about each transaction in the transaction verification,
wherein the received block data includes a first hash value generated from information about the number of nodes stored in the sender's index tree according to the multidimensional index structures, and wherein the index tree of multidimensional index structures is a balanced tree including nodes of a uniform size that is equal to a disk page size, and is a K-dimensional B-tree (K-D-B Tree), and wherein in the index tree of multidimensional index structures a search key is a plurality of fields according to Point Access Method (PAM).

8. The method for providing a search function for blockchain according to claim 7, wherein in the index tree of multidimensional index structures transaction data comprises multidimensional points and is stored in a disk.

9. The method for providing a search function for blockchain according to claim 7, further comprising:
calculating, by the receiver, the number of internal nodes stored in the receiver's index tree additionally created after the transaction verification is completed and generating a second hash value from it; and
verifying, by the receiver, integrity by comparing the first hash value included in the block data received from the sender and the second hash value generated by the receiver.

10. The method for providing a search function for blockchain according to claim 9, wherein each of the first hash value and the second hash value is calculated using information about an index tree created until a previous block, 'Merkle Root' for ensuring integrity of transaction information in a currently inputted block data, and the number of nodes after creating an index tree through the currently inputted block data.

11. The method for providing a search function for blockchain according to claim 9, further comprising:
when the integrity verification succeeds,
verifying, by the receiver, a block header; and
propagating, by the receiver, the block data to other user.

12. The method for providing a search function for blockchain according to claim 7, further comprising:
after the transaction verification is completed,
calculating 'Merkle Root' based on transaction information.

13. A user device for blockchain, comprising:
a processing unit comprising at least one processor communicatively coupled to a memory, the processing unit communicatively coupled to a communication unit and a storage unit, wherein:
the communication unit transmits and receives block data via a network;
the processing unit verifies transactions included in the block data received through the communication unit, and adds the block data as a node to an index tree of multidimensional index structures based on information about each transaction in the transaction verification, wherein the index tree of multidimensional index structures is a balanced tree including nodes of a uniform size that is equal to a disk page size, and is a K-dimensional B-tree (K-D-B Tree), and wherein in the index tree of multidimensional index structures a search key is a plurality of fields according to Point Access Method (PAM); and
the storage unit stores the index tree and the block data.

14. The user device according to claim 13, wherein in the index tree of multidimensional index structures transaction data comprises multidimensional points and is stored in a disk.

15. The user device according to claim 13, wherein the block data received through the communication unit includes a first hash value generated from information about the number of nodes stored in a sender's index tree according to the multidimensional index structures, and
the processing unit:
calculates the number of internal nodes stored in its index tree additionally created after the transaction verification is completed, and generate a second hash value from it, and
verifies integrity by comparing the first hash value included in the block data received from the sender and the generated second hash value.

16. The user device according to claim 15, wherein each of the first hash value and the second hash value is calculated using information about an index tree created until a previous block, 'Merkle Root' for ensuring integrity of transaction information in a currently inputted block data, and the number of nodes after creating an index tree through the currently inputted block data.

17. The user device according to claim 15, wherein when the integrity verification succeeds,
the processing unit:
verifies a block header, and
propagates the block data to other user.

* * * * *